(12) United States Patent
Gorbatov et al.

(10) Patent No.: US 11,449,127 B2
(45) Date of Patent: Sep. 20, 2022

(54) PEAK POWER DETERMINATION FOR AN INTEGRATED CIRCUIT DEVICE

(71) Applicant: Intel Corporation, Santa Clara, CA (US)

(72) Inventors: Eugene Gorbatov, Hillsboro, OR (US); Alexander Uan-Zo-Li, Hillsboro, OR (US); Chee Lim Nge, Beaverton, OR (US); James Hermerding, II, Vancouver, WA (US); Zhongsheng Wang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 227 days.

(21) Appl. No.: 16/642,694

(22) PCT Filed: Sep. 28, 2017

(86) PCT No.: PCT/US2017/054048
§ 371 (c)(1),
(2) Date: Feb. 27, 2020

(87) PCT Pub. No.: WO2019/066860
PCT Pub. Date: Apr. 4, 2019

(65) Prior Publication Data
US 2020/0264692 A1    Aug. 20, 2020

(51) Int. Cl.
*G06F 1/00* (2006.01)
*G06F 1/3296* (2019.01)
*G06F 1/28* (2006.01)

(52) U.S. Cl.
CPC .............. *G06F 1/3296* (2013.01); *G06F 1/28* (2013.01)

(58) Field of Classification Search
CPC .......... G06F 1/32; G06F 1/96; G06F 323/299; G06F 1/3296
See application file for complete search history.

(56) References Cited

U.S. PATENT DOCUMENTS

| 8,549,329 B2 | 10/2013 | Mundada et al. |
| 10,423,202 B2 | 9/2019 | Rotem et al. |
| 2004/0268166 A1* | 12/2004 | Farkas .................... G06F 1/206 713/320 |

(Continued)

FOREIGN PATENT DOCUMENTS

WO    2017176358 A1    10/2017

OTHER PUBLICATIONS

International Search Report and Written Opinion dated Jun. 26, 2018 for International Application No. PCT/US2017/054048, 10 pages.

*Primary Examiner* — Mohammed H Rehman
(74) *Attorney, Agent, or Firm* — Schabe, Williamson & Wyatt, P.C.

(57) ABSTRACT

Peak power setting circuitry is provided to set a peak power value for an integrated circuit device. A power supply interface is to receive a value to estimate a peak power capacity of a power supply serving the integrated circuit device and processing circuitry is provided to calculate an approximate peak power for the integrated circuit device. A peak power for the integrated circuit device is determined by increasing the approximate peak power depending on an amount by which the integrated circuit device power is reduced in response to assertion of a throttling signal.

25 Claims, 10 Drawing Sheets

(56) References Cited

U.S. PATENT DOCUMENTS

| | | |
|---|---|---|
| 2013/0246820 A1 | 9/2013 | Branover et al. |
| 2014/0092106 A1* | 4/2014 | Hurd .................. G06F 13/4072 |
| | | 345/520 |
| 2014/0310539 A1 | 10/2014 | Messick et al. |
| 2014/0380072 A1* | 12/2014 | Lee ....................... G06F 9/5094 |
| | | 713/300 |
| 2016/0179164 A1 | 6/2016 | Park et al. |
| 2016/0231802 A1 | 8/2016 | Jenne et al. |
| 2016/0294197 A1* | 10/2016 | Thompson .............. G06F 1/263 |
| 2017/0293332 A1* | 10/2017 | Rotem ................... G06F 1/324 |
| 2017/0344377 A1* | 11/2017 | Levitan ............... G06F 9/30058 |
| 2018/0284879 A1 | 10/2018 | Gorbatov et al. |

* cited by examiner

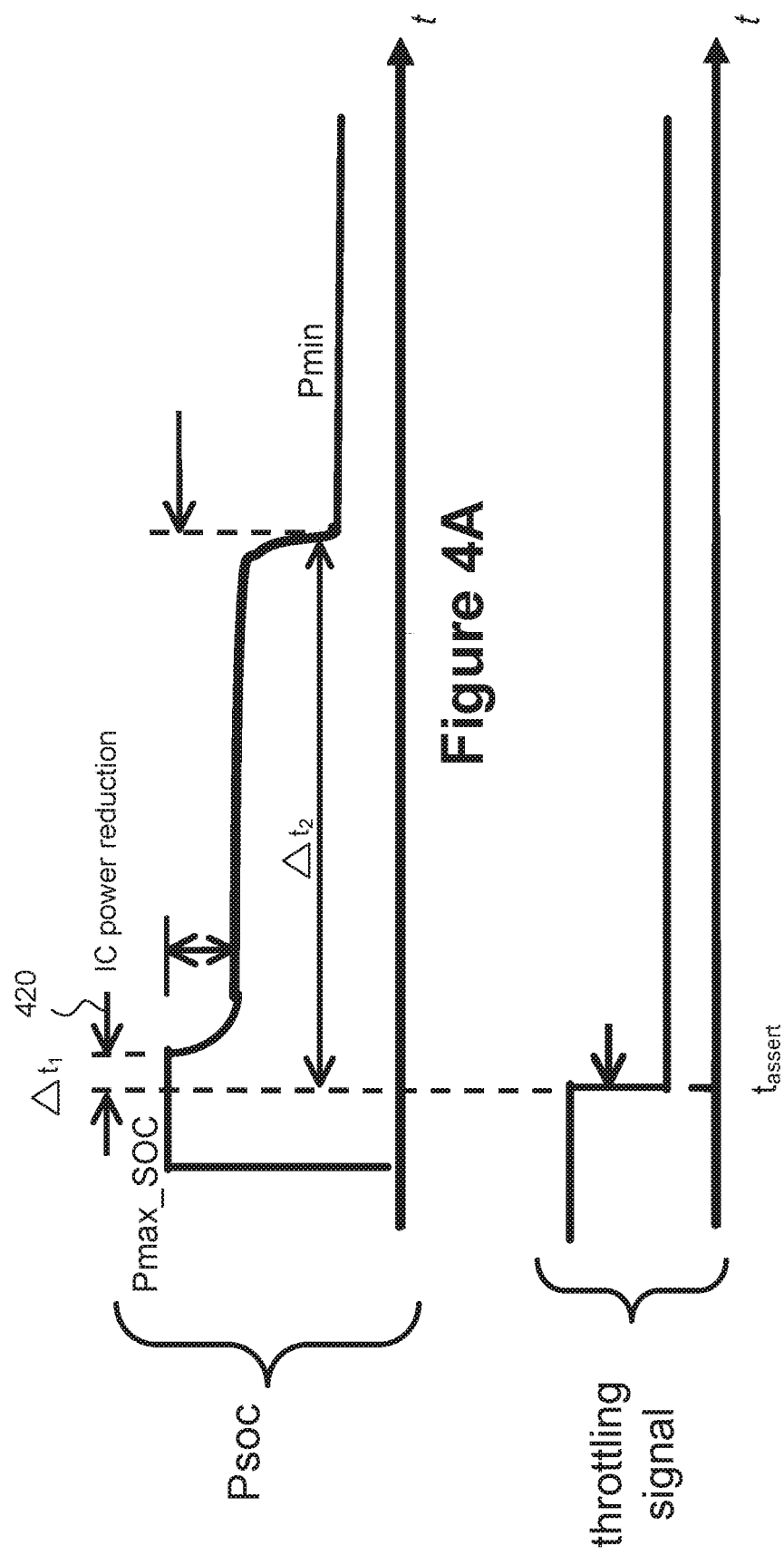

PEAK POWER DETERMINATION FOR AN INTEGRATED CIRCUIT DEVICE

CROSS REFERENCE TO RELATED APPLICATIONS

The present application is a national phase entry under 35 U.S.C. § 371 of International Application No. PCT/US2017/054048, filed Sep. 28, 2017, entitled "PEAK POWER DETERMINATION FOR AN INTEGRATED CIRCUIT DEVICE", which designated, among the various States, the United States of America. The disclosure of International Application No. PCT/US2017/054048 is hereby incorporated by reference in its entirety.

TECHNICAL FIELD

Embodiments described herein generally relate to the field of power limit setting, and more particularly, to peak power determination for an integrated circuit device of a processing platform.

BACKGROUND

As processing platforms evolve, "peak power" is increasing. The peak power is a power limit corresponding to a maximum power potentially consumed by an integrated circuit device such as a System On a Chip (SOC). An SOC may comprise one or more processors, graphics processing unit core(s) and a memory controller. If a peak power, $P_{MAX}$, is incorrectly set then there is a risk of inadvertent system failure resulting from a processing workload causing power spikes (i.e. transients) above a maximum permissible system power or equivalently, causing a voltage "droop" below a threshold operating voltage. Power transients which occur for relatively short periods when running the most power intensive applications may be tolerated by the processing platform if triggering systems are in place to manage the transients. However, if the system is designed such that power transients are too frequent or their duration is longer than permissible then they can cause a noticeable processing performance loss and may even affect a long-term reliability of the processors. Furthermore, the setting of $P_{MAX}$ may have a direct impact on system performance, at least because it may limit a maximum frequency at which the processor cores may operate. Thus there is a balance to be struck between reducing the likelihood of inadvertent system failure and obtaining the best available performance from the integrated circuit device. Appropriate setting of the peak power is an important aspect in achieving this balance.

BRIEF DESCRIPTION OF THE DRAWINGS

Embodiments described herein are illustrated by way of example, and not by way of limitation, in the figures of the accompanying drawings in which like reference numerals refer to similar elements:

FIG. 4A is a graph of SOC power as a function of time;

FIG. 4B is a graph of a throttling signal level against time;

DESCRIPTION OF EMBODIMENTS

Illustrative embodiments of the present disclosure include, but are not limited to, methods, systems and apparatuses and machine-readable instructions for peak power determination in integrated circuit devices.

Figure 1:
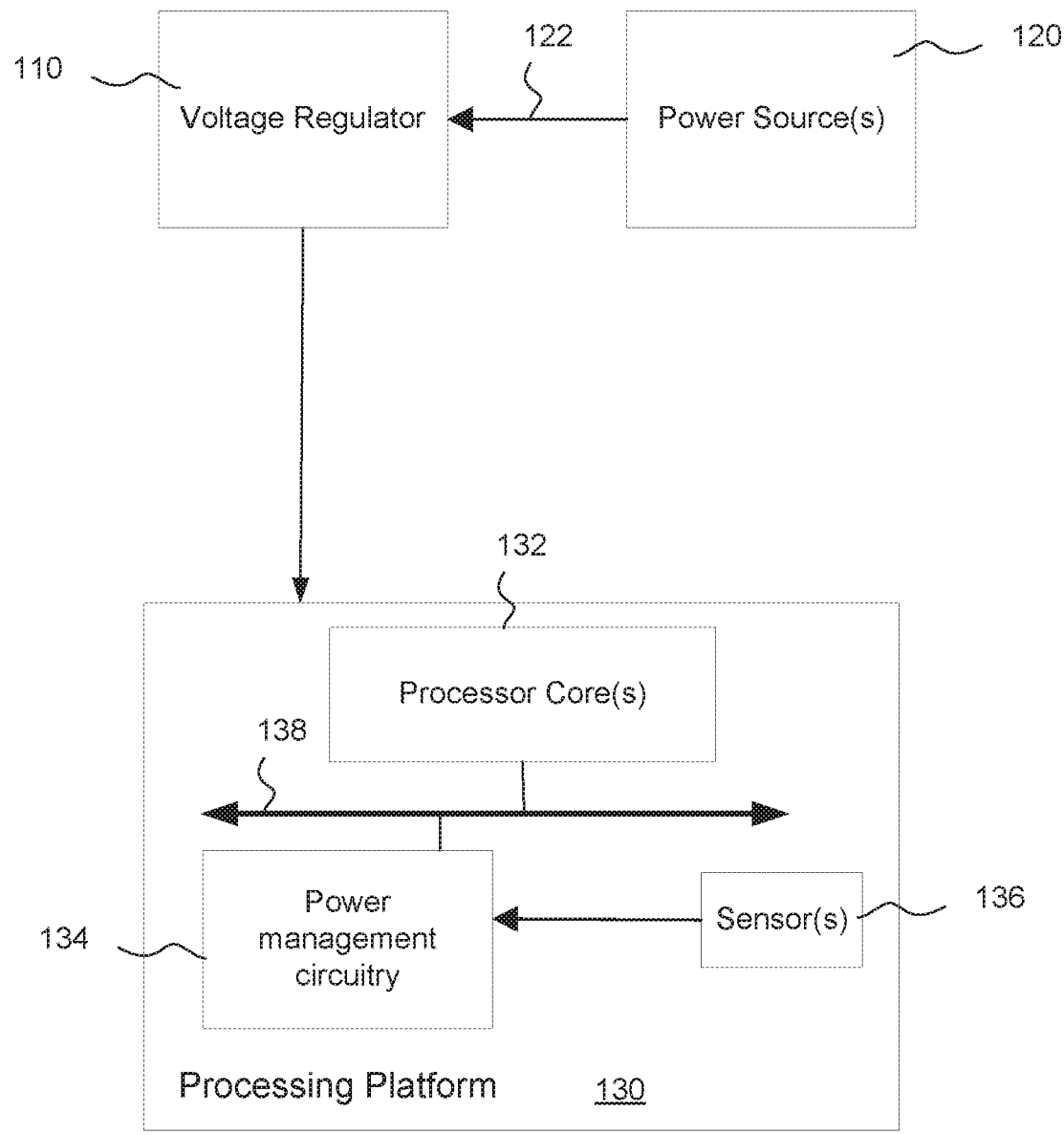
FIG. 1 schematically illustrates a data processing system 100 implementing power management.

FIG. 1 schematically illustrates a data processing system 100 implementing power management. The system 100 comprises a voltage regulator 110, a power source 120 and a processing platform 130. The processing platform 130 may have at least one processor core 132, power management circuitry 134 and at least one sensor 136.

The power source may provide power to one or more components of the processing platform 130 and may provide power to the voltage regulator 110. The processor cores 132 and the power management circuitry 134 may communicate via a system bus 138.

The power source 120 may be a direct current (DC) power source or an alternating current (AC) power source. In some examples, the power source may comprise one or more battery units. The power source 120 may be coupled to components of the processing platform 130 via the voltage regulator 110. More than one voltage regulator 110 may be used. More than one power supply 120 may be used. The voltage regulator 110 may be a separate component relative to the power source and the processing platform 130, or may alternatively be integrated with one or more of the power source 120 and the processing platform 130. Similarly, the power source 120 may be incorporated into other components of the system 100.

The power management circuitry 134 may control supply of power to one or more components of the processing platform 130. The power management circuitry 134 may be coupled to at least one of the voltage regulator 110, the processor cores 132 and the sensors 136. The power management circuitry 134 may control at least one of an operating frequency, an operating current, or an operating voltage to manage power consumption of one or more processor core(s) 132 to maintain a threshold average power within limits over a given time period. The power management circuitry 134 may implement one or more power limiting algorithms to limit a duration of power spikes above or to prevent voltage spikes below corresponding power limits. For example, a first power limit may relate to a threshold for which power could be sustained for up to around 100 seconds, whereas a second, higher, power limit may relate to a threshold for which power could peak for up to, for example, 100 milliseconds. The power limit may be pre-emptive, but may alternatively be reactive. Some power limits may be implemented, for example, by power limiting algorithms preemptively limiting processor frequency to prevent spikes above the peak power, for example by setting a power limit below the peak power.

The power management circuitry 134 may set processor performance levels to a large plurality of different levels such as a high performance level, a medium performance level and a reduced performance level (more generally, the performance level may be dependent on the peak power, and there are numerous performance levels which result from the variation of the peak power setting). Thus the performance levels may be non-discrete. The performance level may be selected by the power management circuitry 134 depending upon a processing workload. The power management circuitry 134 may use a platform power peak value 122 corresponding to an estimated peak power capacity of the power source 120 to enhance processor power management. The platform peak power value 122 may be obtained from the power source 120 and routed to the voltage regulator 110. The platform peak power value signal 122 may be supplied to the power management circuitry 134 of the processing platform 130, or may alternatively be provided via a bus such as a serial video interface (SVID) bus to the processor 132. The platform peak power value signal 122 may provide an estimate of a total thermally relevant platform power consumption which may be a sum of power consumption of the processor core(s) and power consumption of the Rest of Platform (ROP). The processor core(s) 132 may correspond to a System on Chip (SOC) or another integrated circuit device.

The power management circuitry 134 may be coupled to the one or more sensors 136 to receive information indicating a status of the one or more sensors 136. The sensors 136 may be provided proximate to components of the system such as proximate to the processor cores 132, proximate to the power source(s) 120 or proximate to the voltage regulator 110 or proximate to interconnections or any other component associated with the processing platform 130. The sensor(s) 136 may provide measurements of, for example, battery charge levels, battery current values, adapter current values, temperature, operating voltage, operating current, operating power, inter-core communication activity, operating frequency or any other parameter relevant to power or thermal management of the system 100.

Figure 2:
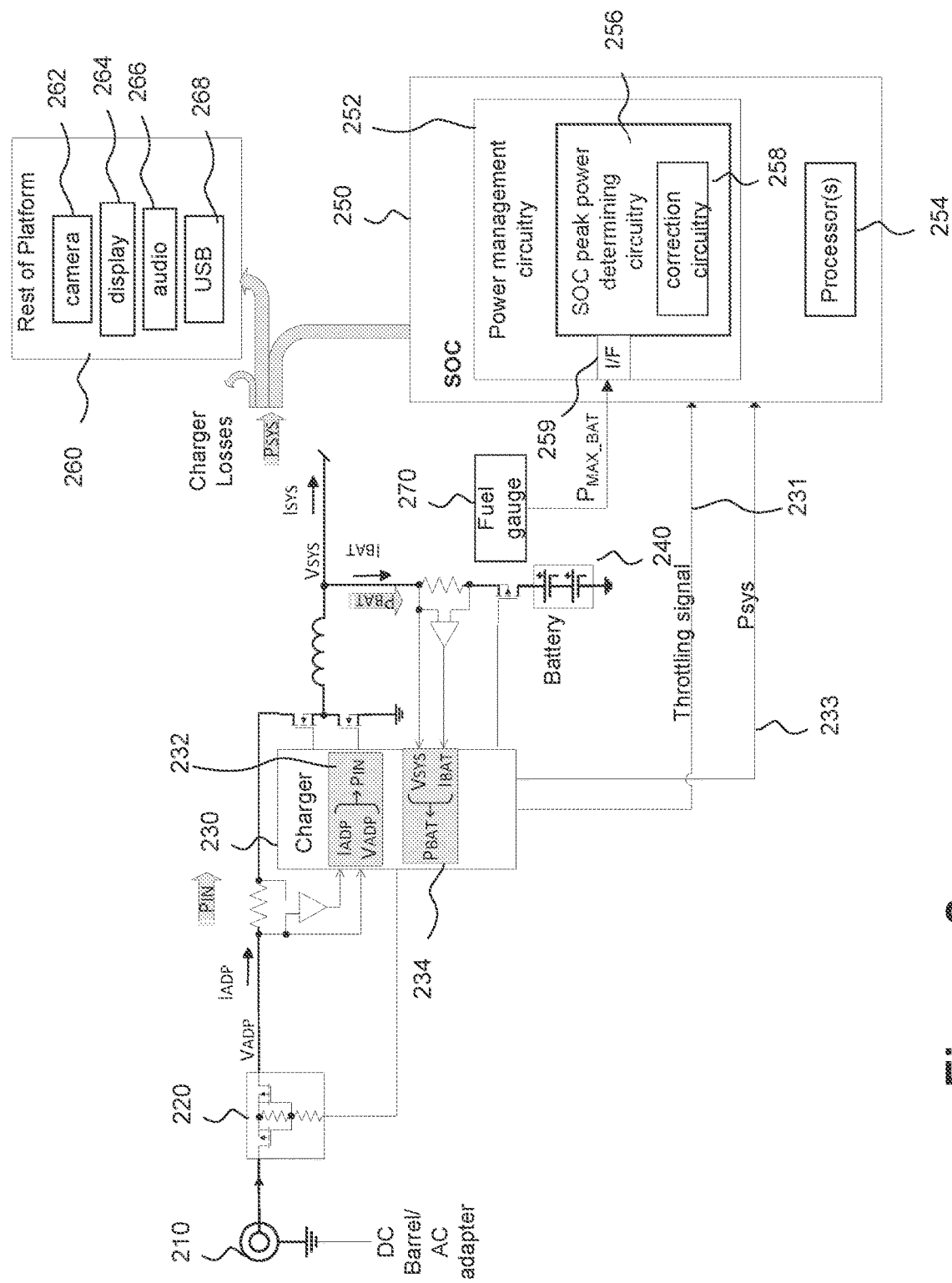
FIG. 2 schematically illustrates an example processing platform 200 comprising peak power determination circuitry.

FIG. 2 schematically illustrates an example processing platform 200 comprising peak power determination circuitry according to the present technique. The platform comprises: an Alternating Current (AC) to Direct Current (DC) adapter 210, an isolation switch 220, a battery charger 230, a battery 240, a System On Chip (SOC) 250, a Rest of Platform (ROP) 260 and a fuel gauge 270. The SOC 250 is one example of an integrated circuit device comprising one or more processors 254, each processor having one or more cores. The SOC 250 also comprises a set of power management circuitry 252 performing functions as described for the power management circuitry 134 of FIG. 1. The power management circuitry 252 comprises peak power determining circuitry 256 including correction circuitry 258 according to the present technique. The peak power determining circuitry 256 may be implemented at least in part by software executed by the power management circuitry 252 or may alternatively be implemented in an embedded controller (not shown) located either on the SOC 250 or elsewhere on the processing platform. At least some components of circuitry for determining the peak power may be located in the charger 230 as illustrated. Additional sensor and microcontroller components such as the fuel gauge 270 may also be used to determine the peak power of the SOC.

An interface 259 is provided to the peak power determining circuitry to receive one or more values to assess a maximum system power. In this example, the interface 259 receives a peak battery power capability from the fuel gauge 270.

The ROP 260 may include a camera 262, a display 264, an audio system 266 and a Universal Serial Bus 268. Each of these example ROP components 262, 264, 266, 268 may sense and report to the SOC a maximum power value likely to be used by the respective component. The SOC 250 may use these maximum power values to apportion a maximum system input power $P_{SYS\_MAX}$ between the SOC 250 and the ROP 250 to determine an approximate peak power available to the SOC 250. In the FIG. 2 embodiment the ROP peak power is estimated by using at least one of:

(i) Adding each of the worst case peak powers for the ROP components 262, 264, 266, 268;

(ii) performing a statistical analysis, such as a root-sum-square on power signals of each ROP component; and (iii) obtaining feedforward from each ROP component, where each ROP component may signal a maximum peak power associated with the respective component at a given moment for use in estimating a maximum possible ROP peak power.

For example, technique (iii) above may be conveniently used in conjunction with technique (ii) to estimate an ROP peak power.

In some embodiments the SOC 250 or other integrated circuit device for which a peak power is to be determined may have a dedicated power supply. In such alternative embodiments power consumption external to the SOC 250 or integrated circuit device need not be taken into account, but it can instead be assumed that the peak power capacity of the power supply is dedicated to the SOC 250 or integrated circuit device.

Furthermore, although the apparatus of FIG. 2 shows a power source arrangement comprising an adapter 210, a charger 230 and a battery 240, other types of power supply arrangements may be used. For example, only an adapter may be used, without the battery and without the charger. A battery may be implemented only as a backup power supply in the event of a mains power failure. A dedicated power supply such as a power supply derived from mains power may be used for the SOC 250 or a dedicated power supply may be provided for a subset of the processing platform including the SOC 250. Alternatively, different portions the SOC 250 or other integrated circuit device may be provided with respective different dedicated power supplies. In such example embodiments, a peak power may be determined for a subset of an integrated circuit device corresponding to a respective power supply.

The fuel gauge 270 may be used to determine at least a battery power, $P_{BAT}$, and a battery current, $I_{BAT}$, for example, by using a coulomb gauge or a sense resistor to monitor a total quantity of charge supplied to the battery in a charge cycle or received form the battery in a discharge cycle. The fuel gauge may provide an indication of at least one of a battery charge level and a full battery capacity in dimensioned units such as Coulombs or Ampere hours. The full battery capacity may decline in value over a battery lifetime due to effects of multiple charge-discharge cycles. The fuel gauge may thus provide an indication of a peak power capacity of the battery at a given time, which may depend on calibration of the battery and a battery charge level at the given time. The fuel gauge may also provide its instantaneous voltage if the load were to disappear (instantaneous no-load voltage) and its AC impedance.

In the FIG. 2 example, the charger 230 may incorporate power monitoring circuitry 232, 234 to perform measurement of battery and adapter power parameters. Parameters that may be measured by the power monitoring circuitry 232, 234 of the charger 230 may include at least one of: the battery power, $P_{BAT}$, the battery current $I_{BAT}$, a battery voltage $V_{BAT}$, a charger power input $P_{IN}$, an adapter current $I_{ADP}$ and an adapter voltage VAN. The system power $P_{SYS\_MAX}$ and system current $I_{SYS}$ and system voltage $V_{SYS}$ are to supply both the SOC 250 and the rest of the platform 260, potentially incurring some charger losses on the way. The battery 240 may draw power from the charger 230 until it is fully charged. The charger 230 may output a throttling signal 231 to the SOC 250. The SOC may be responsive to the throttling signal 231 to "throttle" the one or more processors to activate a power reduction in response to a threshold condition being triggered. For example, the throttling signal 231 may be asserted when at least one of:

1) $V_{SYS}$ has an under-voltage detect (voltage falling below a threshold $V_{MIN}$) indicating that a system voltage of the processing platform has dropped below a minimum value 2) $I_{ADP}$ has an over-current detect indicating that a current above a threshold maximum value $I_{ADP\_MAX}$ is being drawn 3) $I_{BAT\_MAX}$ has an over-discharge detect indicating that a battery current exceeds a maximum battery current threshold value Each of the above three detect levels may be programmable and may indicate that the processing platform may be attempting to draw more power than is available from the power supply and thus is risking inadvertent system shutdown (system crash). For example, a voltage "droop" corresponding to a dip below the otherwise constant target operating voltage level may result from a power transient ("spike") associated with a heavy processing workload. When higher than average power is drawn by the processing platform, the system power and system current tend to increase whereas the system voltage tends to drop down, potentially below a minimum voltage $V_{MIN}$ required for operation of the processing platform, although typically a threshold voltage $V_{TH}$, which is higher than $V_{MIN}$ is set to trigger a "throttling signal" to initiate power reducing functionality. The "throttling signal" may be any signal or value indicating that a threshold power or threshold current or threshold voltage condition has been satisfied and to which a power limiting response may be appropriate. There may be a plurality of threshold values for a given parameter having different magnitudes. $V_{MIN}$ may be a minimum allowable voltage on a voltage rail of the processing platform, for example, $V_{MIN}$ may be around 5.6V to 5.4V depending on system design (2s battery) and 2.5V for a 1s battery for example. Where "1s" refers to one battery cell in series and "2s" refers to two battery cells in series. The throttling signal 231 protects the processing platform from system failure that can arise, for example, due to $P_{SYS}$ exceeding a power available from a power supply. Alternatively, the threshold voltage $V_{TH}$ may depend on an adapter power source or other alternative power source to a battery or a battery unit such as a multi-cell unit. In some embodiments where the battery has no remaining power or where a battery unit is absent the over-current detection $I_{ADP}$ may be used to protect the adapter from more power being drawn by the SOC than the adapter is able to provide.

In a multi-processor system the throttling signal 231 may be asserted to two or more processors of the processing platform, dependent upon a total power being drawn, to implement power throttling (power reduction) to protect against an inadvertent system shutdown.

For example, in response to the throttling signal an operating frequency and an operating voltage of one or more processors may be reduced. The frequency transition may precede the voltage transition when power reduction is being implemented. Conversely, when the throttling signal has been de-asserted, a normal performance level may be restored and in this case the voltage transition may precede the frequency transition. Another technique that maybe used to reduce power consumption of the processing core platform is internal processor core clock modulation according to a duty cycle corresponding to the processor. Such clock modulation involves turning the clock(s) alternately on and off. Modulation cycle times may be independent of processor frequency. A "dummy code" with guaranteed low power consumption is another optional response the assertion of a throttling signal.

Depending on how the throttling threshold condition is configured, it may be appropriate for a given system signal to exceed a threshold (such as a critical power for $P_{SYS}$ or a critical current for $I_{SYS}$) or for the system signal to be below a threshold (such as a critical voltage for $V_{SYS}$) to satisfy the threshold condition. In other examples being greater than or equal to the threshold (for $P_{SYS}$ or $I_{sys}$) or less than or equal to the threshold (for $V_{SYS}$) may satisfy the threshold condition. At least one of $P_{SYS}$, $I_{SYS}$ or $V_{SYS}$ or $I_{ADP}$ or $I_{BAT}$ or any other appropriate signal may be monitored to trigger a warning signal or a critical signal such as the throttling signal 231.

The charger 230 also outputs a system power "$P_{SYS}$" signal 233 to the SOC 250. The system power signal 233 indicates a total power being supplied to the processing platform. The charger 230 of the FIG. 2 example:

i. Measures $I_{ADP}$ and $V_{ADP}$
ii. Measures $I_{BAT}$ and $V_{BAT}$
iii. Computes $P_{IN}$ and $P_{BAT}$
iv. Computes $P_{SYS\_MAX}=P_{IN}-P_{MAX\_BAT}$ ($P_{MAX\_BAT}>0$ when the battery charging; $P_{MAX\_BAT}<0$: discharging)
v. Outputs a current $I_{SYS}$ proportional to $P_{SYS\_MAX}$ 233

In the embodiment of FIG. 2, the input power source is a combination of the battery 240 input and the charger 230 input. The battery input 240 may be selected by a power source selector (not shown) when power from the charger 230 and AC adapter is unavailable. However, when the AC adapter is available to supply power, it may supply power to the SOC 250 and ROP 260. If the battery 240 is not fully charged, the AC adapter 210 may also supply power to charge the battery 240. In alternative examples in which the processing circuitry is, for example, a server or a desktop computer, the system input power supply may be a "silver box" or mains power supply. In further alternative examples, the power supply may be an adapter without any battery.

The SoC 250 of FIG. 2 receives a system power signal, such as the $P_{SYS}$ 233 signal and may use $P_{SYS}$ to monitor when the system power satisfies one or more threshold conditions including a peak power threshold condition. The threshold conditions may relate to average power limits or instantaneous power limits. The threshold conditions may relate to a minimum value for $V_{SYS}$ below which system failure is likely to occur or a maximum value of $P_{SYS}$ or $I_{SYS}$, above which system failure is likely to occur. A threshold voltage $V_{TH}$ and the maximum permissible system power $P_{MAX\_SYS}$ and maximum permissible system current $I_{MAX}$ may be set in the peak power determining circuitry 256, for example by software in the SOC. In other examples these parameters may be set by the embedded controller on the processing platform. $V_{TH}$ may depend on a minimum system voltage $V_{MIN}$ set once by the user. Thus $V_{TH}$ is likely to be higher than $V_{MIN}$. Triggering of assertion of the throttling signal may depend on one or more of the values $V_{TH}$, $I_{MAX}$ and $P_{SYS\_MAX}$. Power control to activate a power reducing feature of the SOC 250 may be performed by the power management circuitry 252 depending on a count of how many times the system signal has satisfied the respective threshold condition.

The SOC 250 may be responsive to assertion of the throttling signal 231 to activate a power reducing feature of the SOC. For example, power consumption may be reduced in response to the throttling signal 231 by reducing a processor frequency within a predictable time window $\Delta t_1$ of the throttle signal being asserted. The power reducing feature in some examples is implemented by the power management circuitry 252 either reactively to respond to a threshold being crossed or preemptively to prevent a threshold being crossed.

Some power thresholds may relate to average power indicators whereas other power thresholds may relate to instantaneous power characteristics associated with "spikes" in processing activity.

According to the present technique the peak system power $P_{SYS\_MAX}$ may be determined as follows:
1. The fuel gauge 270 reports the peak power capability of the battery, $P_{MAX\_BAT}$, 240 to the peak power determining circuitry 256
2. The SOC 250 implements a fast power droop after a throttling signal assertion
3. The charger 230 sets a threshold voltage level $V_{TH}$ to protect the system against the voltage droop and asserts the throttling signal 231 when at least one of $V_{TH}$, $I_{ADP\_MAX}$ or $I_{BAT\_MAX}$ is crossed.
4. The correction circuitry 258 of the peak power determining circuitry 256 counts the number of throttling signal assertions, and uses this to set the SOC peak power at an "optimum" (i.e. best estimate) value which allows a best processing performance whilst reducing the likelihood of performance loss due to frequent assertions of the throttling signal.

Figure 3:
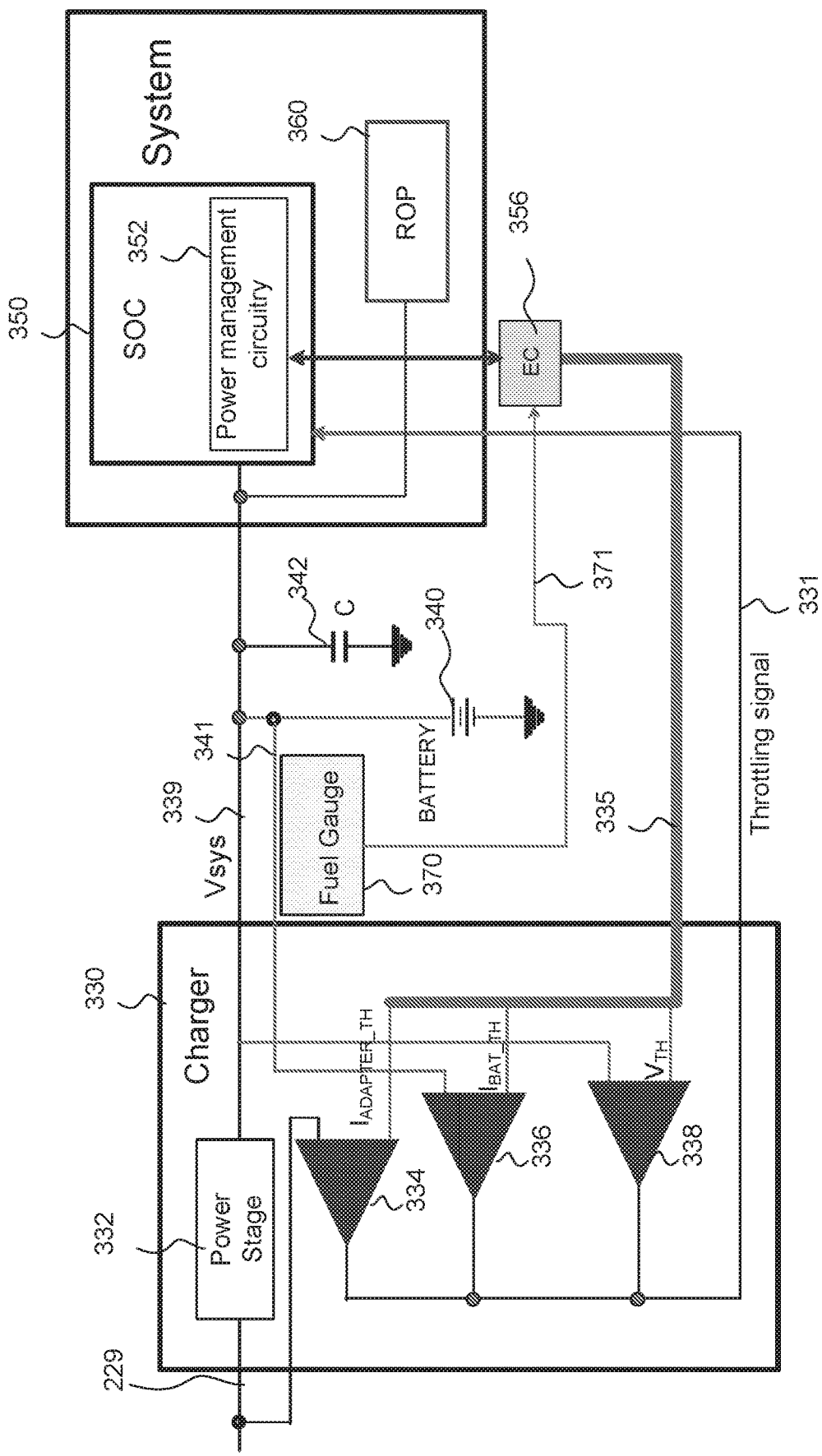
FIG. 3 schematically illustrates an example processing platform, showing in more detail than the FIG. 2 example how a throttling signal is asserted.

FIG. 3 schematically illustrates an example processing platform, showing in more detail than FIG. 2, how the throttling signal is asserted. The FIG. 3 arrangement comprises a processing platform 300 having a SOC 350 incorporating power management circuitry 352 and components corresponding to the Rest Of the Platform 360. Although in some embodiments the Rest of Platform 360 power consumption may be zero, for example, where the charger 330 or alternative power source supplies only the SOC or other integrated circuit device or portion thereof for which a peak power is to be determined. The processing platform 300 is connected via a communication path 339 to a charger 330 and also to a battery 340. A capacitor 342 is also connected to the power path 339 (normally this capacitor represents the input decoupling of the platform power delivery). The capacitor 342 schematically illustrates a total input decoupling of the systems voltage regulators. The capacitor 342 allows the system to jump above a battery peak power because it acts as a filter, that is, the power first comes from this capacitor before it is drawn from the battery. An embedded controller 356 in this example is provided externally to the processing platform 300 and is connected via a bus 335 to the charger 330. In alternative examples, the embedded controller may be integrated with the processing platform 300. For example, functionality associated with the embedded controller 356 may alternatively be provided by the power management circuitry 352 of the SOC 350.

A fuel gauge 370 is connected to the battery 340 and supplies data via a signal path 371 to the embedded controller, the data comprising at least a maximum available battery power $P_{MAX\_BAT}$ and also a battery instantaneous voltage $V_{BAT}$ at no load and potentially the system AC resistance Rsys. The values of $P_{MAX\_BAT}$ and $V_{BAT}$ and Rsys are likely to vary with a charge level of the battery, temperature, load and can change as the number of battery charge-discharge cycles increases with battery age. Values of $P_{MAX\_BAT}$ and $V_{BAT}$ and Rsys are supplied by the embedded controller 356 via the communication path 357 to the power management circuitry 352. The power management circuitry 352 uses these values to calculate the system threshold voltage $V_{th}$ and sets this value in the charger 330 or potentially a Voltage Regulator (VR), or an external circuit. The system threshold voltage $V_{th}$ corresponds to a minimum voltage to which the processing platform 300 is permitted to drop to protect the platform against inadvertent system failure, which can occur if a power drawn by the platform exceeds a power that the power supply is capable of sustaining or is dangerously close to it.

The charger 330 comprises: a power stage 332; a first comparator 334 to test an adapter current, $I_{ADD}$, value against an adapter current threshold $I_{ADAPTER\_TH}$; a second comparator 336 to test a battery current, $I_{BAT}$, value against a battery current threshold $I_{BAT\_TH}$; and a third comparator 338 to test a system voltage, $V_{sys}$, value against the system voltage threshold $V_{th}$. The power stage 332 represents the switching Field Effect Transistors (or other switching elements), and the inductor of the charger. The three threshold values $I_{ADAPTER\_TH}$, $I_{BAT\_TH}$ and $V_{TH}$ may be calculated by the power management circuitry 352, supplied to the embedded controller 356 and transmitted over the bus 335 to the charger comparators 334, 336, 338 respectively.

The first comparator 334 performs a comparison of an adapter current signal value from a signal 229 prior to the power stage 332 of the charger with the threshold $I_{ADAPTER\_TH}$ to determine if the adapter current is too high. The second comparator 336 performs a comparison of a battery current signal value obtained from a communication line 341 connecting it to the battery 340, with the threshold $I_{BAT\_TH}$ to determine if the battery current is too high. The third comparator 338 performs a comparison of the system voltage $V_{SYS}$ obtained from the signal line 339 in the charger output by the power stage 332 to determine if $V_{SYS}$ has impermissibly dropped below $V_{TH}$. If any one or more of the three thresholds triggers a threshold condition indicating that $I_{ADAPTER\_TH}$ or $I_{BAT\_TH}$ are too high or indicating that $V_{SYS}$ is too low (so-called "voltage droop") then the charger may assert a throttling signal 331 to the SOC 350 to trigger a power reducing feature of the SOC 350. The throttling signal 331 may be de-asserted by the charger when the charger determines that the threshold comparisons performed by the comparators 334, 336, 338 indicate that the power reduction has effectively reduced the risk of inadvertent system failure or after a certain fixed amount of time.

FIGS. 4A and 4B schematically illustrate in graphical form, how the SOC 250, 350 of FIG. 2 and FIG. 3 respond to assertion of the throttling signal 231, 331. FIG. 4A is a graph of SOC power as a function of time whereas FIG. 4B is a graph of a throttling signal level against time, so overall the graphs show the SOC power, which is throttled by the throttle signal. In this example the throttling signal is an "active low" so a low signal value represents an assertion whereas a high signal value represents a non-assertion. An assertion of the throttling signal at 410 corresponding to a time $t_{ASSERT}$ may occur in response to the system power $P_{SYS}$ ($P_{MAX\_SOC}$ plus $P_{ROP}$) for the whole processing platform rising above a maximum power threshold $P_{SYS}$. Equivalently, assertion of the throttling signal may be responsive to the system voltage for the processing platform dropping below $V_{TH}$. The SOC power is one important component of $P_{SYS}$ and thus assertion of the throttling signal is likely to coincide with a peak in the SOC power as shown in FIG. 4A. In this example the throttling signal is asserted when the system power threshold $P_{MAX\_PLATFORM}$ has been exceeded for at least a predetermined time, sometimes denoted a "debounce time" or alternatively, when the system voltage $V_{SYS}$ has crossed $V_{TH}$ from above (voltage droop) for the predetermined time. Crossing of the thresholds $P_{MAX\_PLATFORM}$ or $V_{TH}$ may correspond to excursions (spikes) of the respective signals, rather than relating to average values. The crossing of $P_{MAX\_PLATFORM}$ or $V_{TH}$ may be detected by the charger 330 (see FIG. 3).

The power management circuitry 352 is responsive to the throttling signal 331 to invoke one or more power limiting algorithms on components of the SOC to reduce the power being drawn by the processing platform. For example, an operating frequency of one or more processor(s) of the SOC 350 may be reduced. As shown in FIG. 4A there is a short SOC power reduction delay time 420 between assertion 410 of the throttling signal and a time when the SOC power drops from $P_{MAX\_SOC}$ as a result of the power limiting algorithm(s). The SOC power reduction delay time 420 may be, for example of the order of 10 μs, but this value may be implementation dependent and is non-limiting. It can be seen in FIG. 4A example that the SOC power reduces within tens of μs (see $\Delta t_1$) by a reduction factor of around a 30% reduction relative to $P_{MAX\_SOC}$ and may be in some implementations be dependent on the Pmax_SoC, which can be taken into the account in the algorithm. The reduction factor or value of the power reduction may vary depending on the processing scenario and depending on the particular power limit, but may be guaranteed by design in the processing platform.

Although FIGS. 4A and 4B show a single power limit Pmax_SOC, which may be a power limit that cannot be exceeded and corresponds to triggering of the throttling signal, there may be two or more different power limits, each of which is associated with a respective throttling signal (or some alternative threshold traversal indicator) if that threshold is exceeded. The different power limits and different throttling signals may result in triggering different power-limiting responses by the SOC or other integrated circuit device.

Figure 4C:
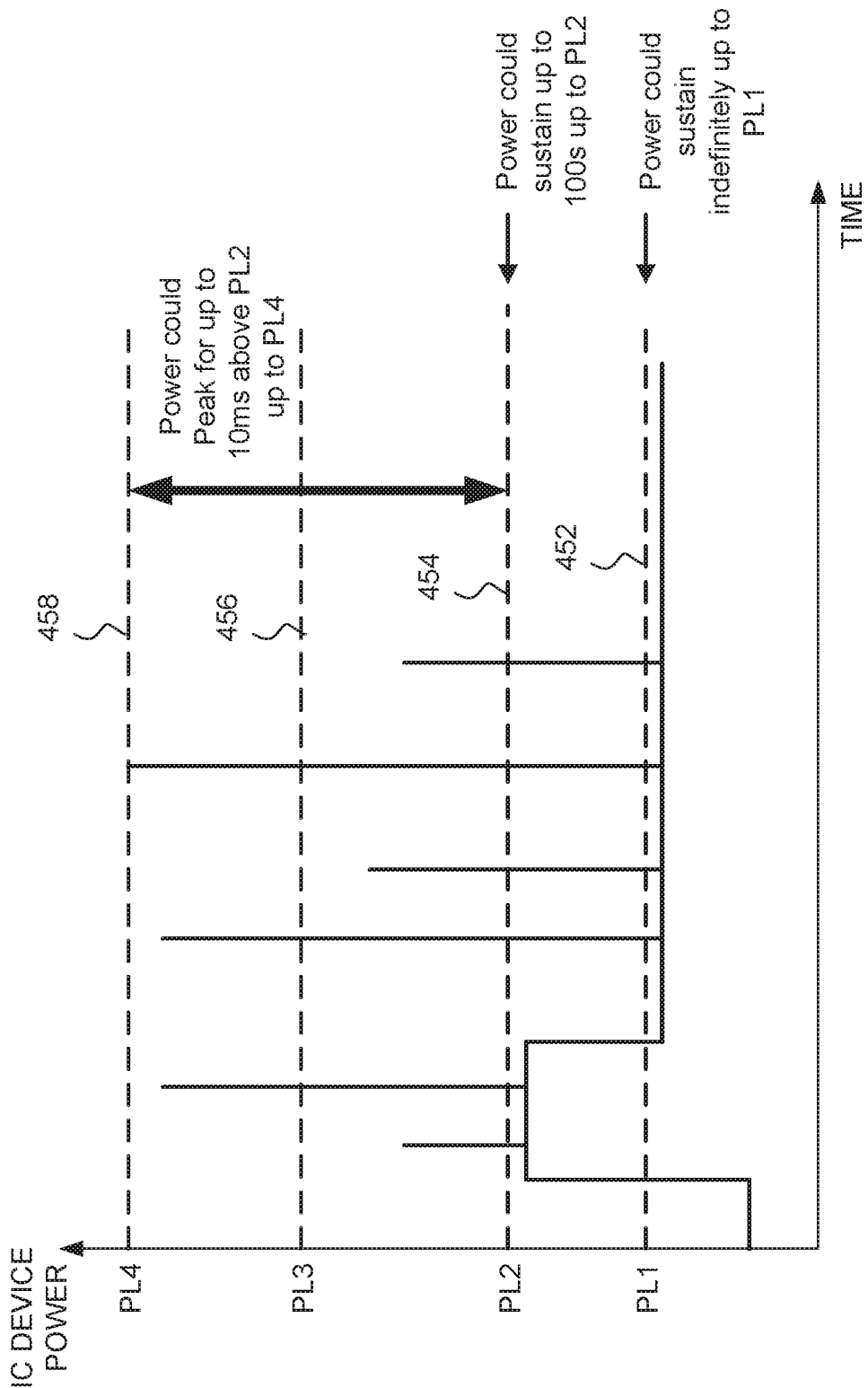
FIG. 4C is a graph of integrated circuit device power against time schematically illustrating a plurality of power limits.

FIG. 4C schematically illustrates a plurality of different power limits for an integrated circuit device. For example: a first power limit "PL1" 452 may correspond to an average power threshold not to be exceeded by the integrated circuit device but at which the integrated circuit device could sustain power indefinitely; a second power limit "PL2" 454 may be a power limit higher than PL1 corresponding to a power level that may be sustained by the integrated circuit device for up to a first duration (for example, 100 seconds) and above which one or more power limiting algorithms attempt to limit power transients of the integrated circuit device; a third power limit "PL3" 456 may be higher than PL2 and may result in a power-reducing response of the integrated circuit device to reactively limiting processing frequency to limit a duty cycle of transients above PL3 a fourth power limit 458 may correspond to a power limit that may not be exceeded by the integrated circuit device such that power-limiting algorithms may preemptively limit processing frequency to prevent spikes above this fourth power limit. Power transients may be permitted to peak at powers above PL2 and up to PL4 for up to a predetermined time relatively short (such as 10 ms in the FIG. 4C example) in comparison to the time (e.g. around 100 s) for which the integrated circuit device may sustain power at power levels between PL1 and PL2.

According to some embodiments a plurality of different peak powers may be determined corresponding to a respective plurality of different power limits for an integrated circuit device. The peak power being determined in each case based on a power-limiting response of the integrated circuit device to the particular power limit. Different power-limiting algorithms may be implemented in response to the different power limits 452, 454, 456 and 458 being exceeded. In one example embodiment, the peak power for each of PL2 454 and PL4 458 is determined based on an estimated peak power, increased by an amount depending on a known power-limiting response of the integrated circuit device to the particular power limit.

Returning to the scenario of FIG. 4B, there may be a further stage of power reduction within $\Delta t_2$ to a power level $P_{MIN\_SOC}$, which in the example of FIG. 4A, occurs within 100 μs to 200 μs of assertion 410 of the throttling signal. At a subsequent time (not shown), when the throttling signal may be de-asserted, the SOC performance level may be increased.

In the hardware implementation of FIG. 3, the embedded controller sets $V_{TH}$ based on the battery peak power capability $P_{MAX\_BAT}$ calculated by the fuel gauge 370. This is an implementation that has low impact on the rest of the system and is efficient to implement.

Appropriate setting of $V_{TH}$ according to the present technique may allow the peak integrated circuit power ($P_{MAX\_SOC\_PK}$ or $P_{MAX\_SOC\_OUT}$ in FIG. 5) to be set to a higher value than it otherwise might be ($P_{MAX\_SOC\_APPROX}$ in FIG. 5) by taking advantage of the known response of the processing platform to the throttling signal, whereby a percentage power reduction or a predetermined magnitude of power reduction should be achieved within a given SOC power reduction delay time 420. For example, after the throttling signal is asserted at 410, if it is known that the SOC is guaranteed to drop power by at least 33% (one non-limiting example) in a given time, then $P_{SOC}$ after throttling should be equal to ⅔ of $P_{SOC}$ before throttling within tens of μs. This can be exploited to set a maximum value of $P_{sys}$ (i.e. $P_{MAX\_PLATFORM}$) above a level that could cause inadvertent system failure if the system did not implement power throttling. Thus, according to the present technique, $P_{MAX\_SOC\_PK}$ (value increased depending on known throttling power reduction) may be set equal to $P_{MAX\_SOC\_APPROX}*3/2$ relying on the fact that Psys should not exceed the peak system power for longer than it takes to implement the throttling. Thus the throttling implemented in the processing platform is exploited to effectively "overshoot" in setting peak $P_{MAX\_SOC}$ because there is a fallback of the SOC power being reduced by a given reduction percentage whenever the throttling signal is asserted. In other words the peak power of the integrated circuit device can be deliberately set to exceed the battery power limitation determined from the fuel gauge. This is done by exploiting the power reduction implementation expected in response to the throttling signal assertion. If the platform can supply the power exceeding the Pmin for a certain duration and for a certain amount of time, this too could be used to calculate the allowable Pmax of the SOC. The drop in power in response to throttling may vary according to a complex function, rather than being a predetermined percentage.

Figure 5:
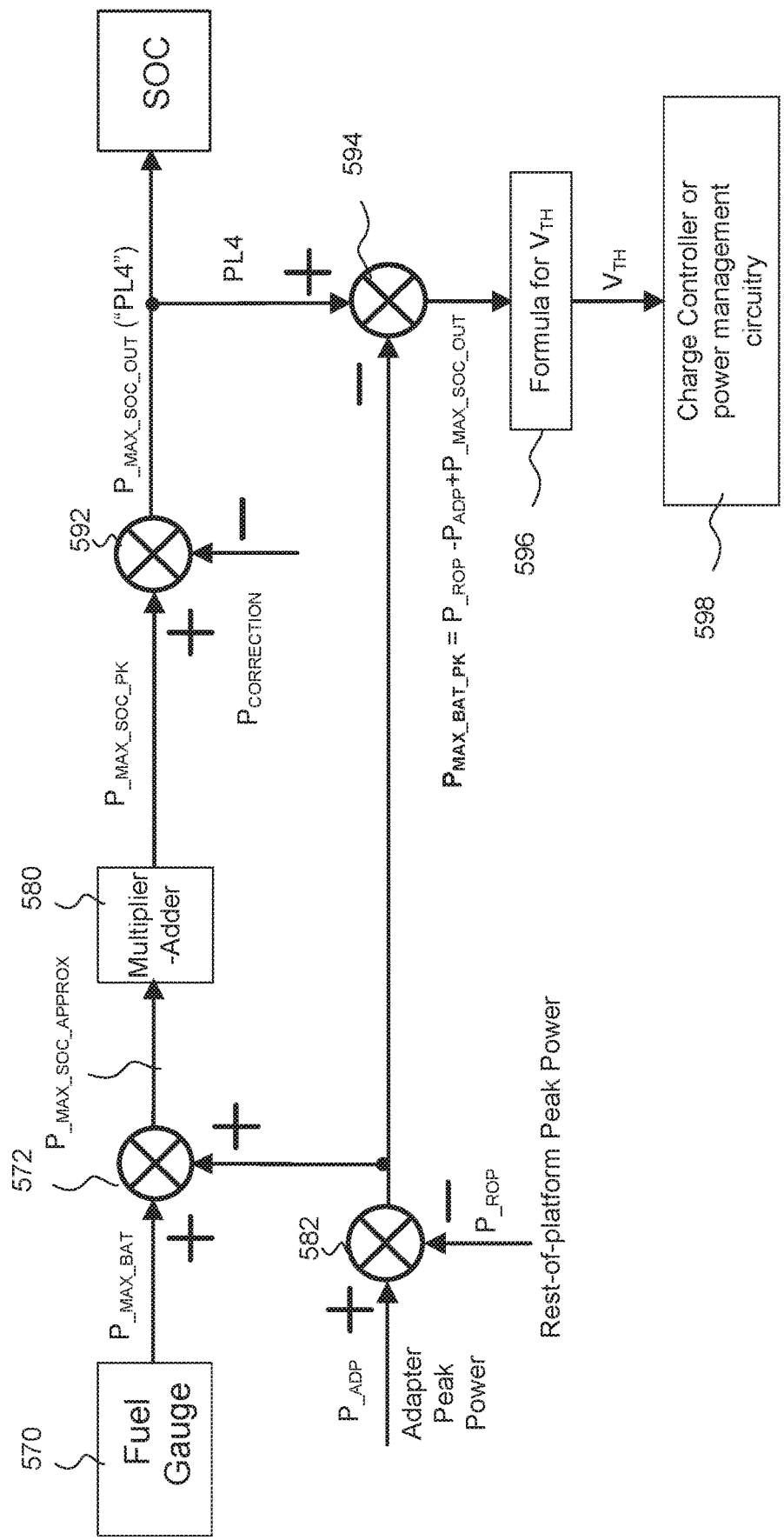
FIG. 5 schematically illustrates circuitry to perform setting of a system threshold voltage $V_{TH}$ and an integrated circuit peak power value $P_{MAX}$.

FIG. 5 schematically illustrates circuitry to perform setting of the system threshold voltage $V_{TH}$ and the SOC peak power value $P_{MAX\_SOC}$. The circuitry comprises a fuel gauge 570, a first adder 572, a multiplier-adder unit 580, a first subtracter 582, a SOC 550, a second subtracter 592, a third subtracter 594, a system threshold calculator 596 and a charge controller 598. The multiplier-adder unit 580 may be any processing circuitry to calculate a general function (a "peak power enhancement function") of a throttling characteristic of the SOC. For example, the multiplier/adder could be any processing circuitry to calculate a mathematical function, such as a complex function preset by a central processing unit supplier. The function may vary with, say, Pmax levels (because a drop in power in response to throttling may be dependent on the peak power that is set). The adder 572 and subtracters 582, 592, 594 may be implemented by software. Although they may alternatively be implemented in hardware, such as by using operational amplifiers or logic gates.

The first subtracter 582 subtracts a ROP peak power $P_{ROP}$ from an adapter peak power $P_{ADP}$ and supplies a result to the first adder 572, where it is added to the battery peak power $P_{MAX\_BAT}$ read from the fuel gauge 570. Thus an output of the first adder 572 corresponds to a SOC peak power value, $P_{MAX\_SOC\_APPROX} = P_{MAX\_BAT} + P_{ADP} - P_{ROP}$. This value, $P_{MAX\_SOC\_APPROX}$ is output by the first adder 572 to the multiplier-adder unit 580, where it is multiplied by a factor depending on a throttling assertion power reduction. In this example, the silicon designers may guarantee that the SOC power should be dropped by at least 33% (to give $⅔*P_{TRIGGER}$, where $P_{TRIGGER}$ is the SOC power when the throttling signal was triggered) in 10 μs after throttling signal assertion. Thus $P_{MAX\_SOC}$ may be multiplied by a reciprocal of ⅔ to give $1.5*P_{MAX\_SOC}$ on output from the multiplier-adder unit 580. The multiplier factor may differ in alternative examples. The value of $P_{MAX\_SOC\_APPROX}$ may alternatively be increased depending on the throttling amount by adding one or more values and is not limited to multiplication to achieve the increased value. The peak power may be increased further in example embodiments where active $V_{MIN}$ protection is implemented. Active $V_{MIN}$ protection comprises providing an input capacitor in the charger to store charge that may be used to supplement the battery when the system voltage drops below a threshold voltage and the throttling signal is asserted. Discharging the input capacitor may keep the battery above $V_{TH}$ and the charger may then re-charge the input capacitor. The voltage of this input capacitor may be taken into account by the multiplier-adder 580 in determining the peak power of the SOC.

An output of the multiplier-adder unit 580 corresponds to an increased approximate peak power of the SOC (one example of an integrated circuit device) $P_{MAX\_SOC\_PK}$, which is supplied as an input to the first subtracter 582. The second subtracter 592 may perform a correction to $P_{MAX\_SOC\_PK}$ depending upon number of throttling signals asserted in a given time interval. A high rate of throttling signal assertion may indicate that the risk of inadvertent system failure is higher than acceptable or at least that there may be a noticeable performance loss due to frequent throttling. By way of contrast, a low rate of throttling signal assertion may indicate that $P_{MAX\_SOC\_PK}$ has been set too low and that a higher processing platform performance might be achieved without unduly risking inadvertent system failure.

Different thresholds may be provided as an upper limit and a lower limit for throttling threshold values. Alternatively, a single threshold value may be used such that a count above the threshold is associated with setting a value, $P_{CORRECTION}$, to decrease the approximate peak SOC power whereas a count below the same threshold may be associated with setting a value of $P_{CORRECTION}$ to increase the approximate peak SOC power. The value of $P_{CORRECTION}$ applied at the second subtracter 592 may be zero if the number of assertions of the throttling signal is within an acceptable range. The correction value $P_{CORRECTION}$ may be determined by software in the power management circuitry 252, 352 (See FIGS. 2 and 3) or by firmware of the embedded controller 356. Furthermore, $P_{CORRECTION}$ may be calculated iteratively, for example, by using a Proportional-Integral-Differential (PID) algorithm, which may provide a more rapid response to a change in the number of throttling signal assertions.

An output of the second subtracter 592, which corresponds to the peak power for the SOC, $P_{MAX\_SOC\_OUT}$, is supplied to the SOC 550 and may be used to determine a maximum frequency of one or more processors of the SOC.

The third subtracter 594 of FIG. 5 is arranged to subtract an output of the first subtracter 582, corresponding to ($P_{ADP}-P_{MAX\_ROP}$) from the output of the second subtracter 592 $P_{MAX\_SOK\_OUT}$ (for example, "PL4"). Thus the third subtracter 594 calculates $P_{MAX\_BAT\_PK}=P_{MAX\_SOC\_OUT}-(P_{\_ADP}-P_{\_ROP})=P_{MAX\_SOC\_OUT}-P_{\_ADP}+P_{\_ROP}$, which is a value corresponding to the peak battery power. This value $P_{MAX\_BAT\_PK}$ is supplied to the threshold voltage calculation circuitry 596, where it is used in a formula to calculate $V_{TH}$. Note that $P_{MAX\_BAT}$ is a peak power capability of the battery (a limit) such that drawing a power above this limit may result in a system crash. By way of contrast, $P_{MAX\_BAT\_PK}$, is a calculated maximum value which may be higher than $P_{MAX\_BAT}$ as facilitated by the safeguarding against system crash according to the present technique. An output of the threshold voltage calculation circuitry 596 is supplied to at least one of the charger 230 and the power management circuitry 252 of FIG. 2 (or to the same components in FIG. 3) to be used as a threshold for triggering assertion of the throttling signal.

One non-limiting example formula for calculation of the system threshold voltage is as follows:

$$V_{TH} = \frac{4 \cdot R_{sys} \cdot (\sqrt{A/2 \cdot R_{sys}} - B/8 \cdot R_{sys})}{2 \cdot C \cdot R_{sys} - \Delta t} \quad \text{equation 1}$$

where $$A = C^2 \cdot R_{SYS}^2 \cdot V_{MIN}^2 + 2 \cdot P_{MAX\_BAT\_PK} \cdot C \cdot R_{SYS}^2 \cdot \Delta t - C \cdot R_{SYS} \cdot V_{BAT} \cdot V_{MIN} \cdot \Delta t - P_{MAX\_BAT\_PK} \cdot R_{sys} \cdot \Delta t^2 + \frac{V_{BAT}^2 \cdot \Delta t^2}{4} \quad \text{equation 2}$$

and $$B = 2 \cdot V_{BAT} \cdot \Delta t - 2 \cdot V_{MIN} \cdot \Delta t \quad \text{equation 3}$$

and $$R_{sys} = \frac{V_{min} \cdot (V_{bat} - V_{min})}{P_{MAX\_BAT\_PK}} \quad \text{equation 4}$$

$R_{sys}$ is an estimate for an impedance of the battery for short duration power pulses (could be supplied by the fuel gauge).

C is a total effective capacitance of input decoupling of the system Voltage Regulators.

$V_{min}$ is a minimum system voltage that may be set once by the implementer of the processing platform.

$\Delta t$ is a duration of time between the throttling signal being asserted and the SOC power dropping to a reduced level (corresponding for example to time period 420 in the FIG. 4A example). In some examples $\Delta t$ may be around 20ρs.

Note that there is an interdependence between $P_{MAX\_SOC\_PK}$ and $V_{TH}$ via the term $P_{MAX\_BAT\_PK}$ supplied as input to the threshold voltage calculation circuitry 596 because $P_{MAX\_BAT}\_PK=P_{MAX\_SOC\_OUT}-P_{\_ADP}+P_{\_ROP}$. The battery impedance, $R_{sys}$ also depends on $P_{MAX\_SOC\_OUT}$. Thus, when $P_{MAX\_SOC\_OUT}$ is updated, for example, due to a number of throttling assertions exceeding an upper threshold, then it may be appropriate to update $V_{TH}$ correspondingly. The values $V_{TH}$ and $P_{MAX\_SOC\_OUT}$ may be set independently. However, it may be efficient to have a dependency between the two values because, in practice, if $V_{TH}$ is set too high, the throttling signal is likely to be asserted so frequently as to potentially have a detrimental effect on processing performance. On the other hand, if $V_{TH}$ is set too low then there may be an unacceptably high likelihood of inadvertent system failure, which can result, for example, in "blackscreen" on the processing platform. In the FIG. 5 embodiment, $V_{TH}$ takes into account the adapter power because if, for example, the adapter power is 50 W, the value of $P_{\_MAX\_SOC\_APPROX}$ includes this component and this value is then increased (e.g. multiplied by 3/2). The value of $V_{TH}$ in this non-limiting example is taken from the battery, but the value of $P_{ADP}$ rather than the increased value is subtracted from $P_{\_MAX\_SOC\_OUT\_PK}$ at circuit element 594 to determine an input to the $V_{TH}$ calculation.

In the FIG. 5 embodiment $V_{TH}$ is calculated depending on the peak maximum battery power, but this is non-limiting. $V_{TH}$ may be set based on different power source or a combination of power sources or based on characteristics of the integrated circuit device, for example.

In the circuit of FIG. 5, the power source is shown to include a battery power and an adapter peak power, to be included if the adapter is present. In alternative embodiments, the integrated circuit device for which the peak power "PL4" is being calculated may have a power source other than a battery. For example, the power source may comprise an adapter only or another non-battery based power source such as a dedicated power supply or mains power. The rest-of-platform peak power may be zero in some examples. Thus the value of $P_{MAX\_SOC\_APPROX}$ that is input to the multiplier-adder 580 may depend only on a non-battery based power source peak power capacity.

Furthermore, the threshold voltage $V_{TH}$, associated with potential assertion of the throttling signal may be independent of $P_{MAX\_SOC\_OUT}$ (or "PL4") in some embodiments or it may depend on $P_{MAX\_SOC\_OUT}$ (or "PL4") but be independent of at least one of battery power and the rest-of-platform peak power. Furthermore, as shown in the FIG. 3 embodiment, the throttling signal may be triggered by the adapter current or the battery current meeting a respective threshold condition as an alternative to triggering throttling via the value of the system voltage dropping below the threshold voltage $V_{TH}$.

In some embodiments, such as embodiments having no battery power, an adapter power source may be operated in "turbo" mode such that one or more processors of the integrated circuit device adjust their processing frequencies adaptively to give temporarily boosted performance whilst staying within power limits such as an average power over a time period. In such example embodiments, a power limit may be associated with the adapter such that a throttling signal maybe asserted when a thresholding condition of the adapter is satisfied. For example an adapter over current threshold or an adapter voltage threshold or an adapter critical power threshold being traversed. In this case the correction may depend on a threshold count corresponding to the adapter rather than to the battery.

Figure 6:
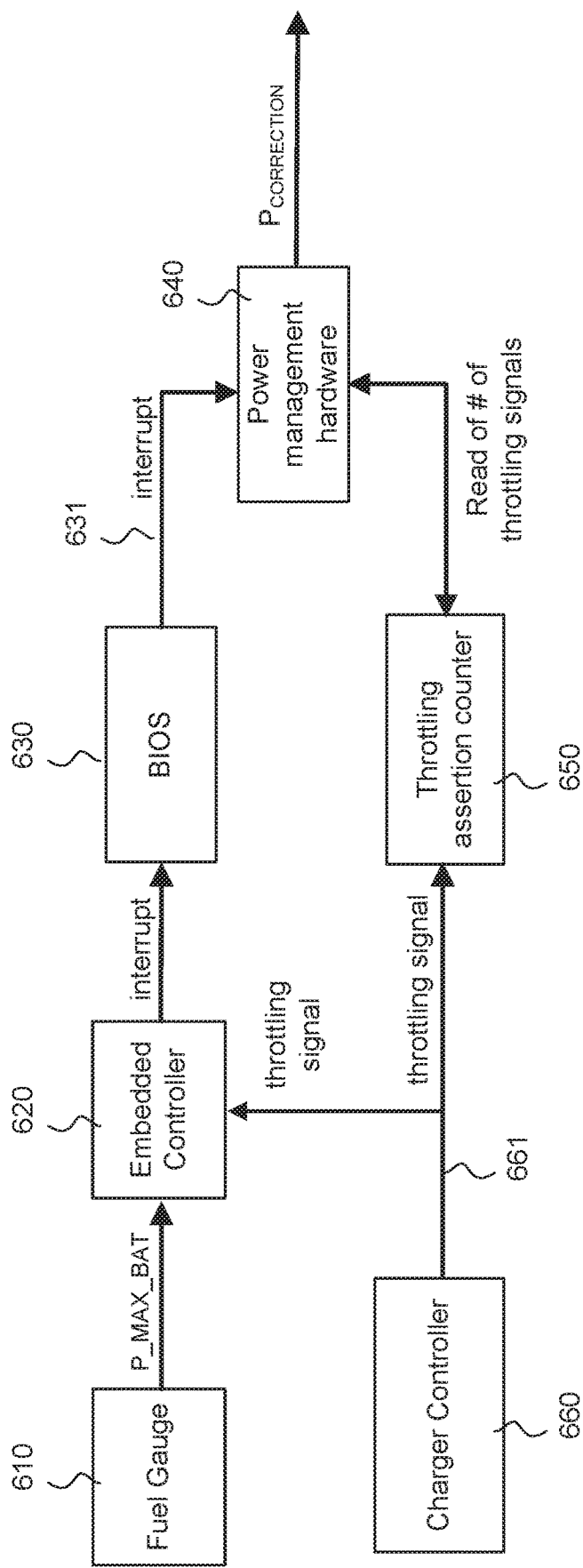
FIG. 6 schematically illustrates a generic scheme to determine a correction amount to the approximate value of the peak SOC power.

FIG. 6 schematically illustrates a generic scheme to determine a correction amount to the approximate value of the peak SOC power $P_{MAX\_SOC\_APPROX}$, as applied by the first subtracter 582 of the FIG. 5 embodiment. The arrangement comprises a fuel gauge 610, an embedded controller 620, a Basic Input and Output System (BIOS) 630, a set of power management circuitry 640, a counter 650 and a charger controller 660.

The fuel gauge 610 supplies measurements of battery state of charge and peak battery power $P_{MAX\_BAT}$ to the embedded controller 620. The embedded controller is responsive to changes in battery capability such as a change in the battery state of charge or battery peak power to generate an interrupt 621 to the BIOS 630, which triggers a consequential interrupt 631 to the power management circuitry 640 to trigger recalculation of a value of $P_{CORRECTION}$. Recalculation of may also be initiated in response to the assertions of the throttling signal 661 output by the charger controller 660 being outside an acceptable range. The acceptable range may be implementation dependent, but in one example, the following pseudocode may be used to calculate $P_{CORRECTION}$ depending on the throttling signal assertion rate.

Example Pseudocode to Find Pcorrection
If # of throttling signals is >3 in 10 s, $P_{CORRECTION}=P_{CORRECTION}+2$ W;
If # of throttling signals is <3 in 10 s, $P_{CORRECTION}=P_{CORRECTION}-2$ W;
If $P_{CORRECTION}<0$, $P_{CORRECTION}=0$.

This pseudocode example is provided as one simple example implementation. However, at least one of the time period, the thresholds for the throttling signal numbers and the magnitude of the correction values may differ. In the example above, if the number of throttling signal assertions in the last 10s exceeds 3, then $P_{CORRECTION}$ may be increased by the 2 Watts (W). If the number is lower, than the $P_{CORRECTION}$ may be decreased by 2 W. The value of $P_{CORRECTION}$ may be zero and negative values may be reset to zero as shown above.

The charger controller 660 may correspond, for example to a component of the charger 330 of the FIG. 3 embodiment. The charger controller 660 asserts a throttling signal 661, which is received both by the counter 650 and the embedded controller 620. The counter accumulates occurrences of throttling signal assertions and may be reset when the count value is read by the power management circuitry 640. The count may be read by the power management circuitry 640 at regular intervals or more sporadically in response to an event such as a detection that the system power is above a threshold value. A plurality of throttling signals may be asserted depending on a respective plurality of different power limits. A determination of a peak power value associated with a given power limit may depend on a power-reducing response to the integrated circuit device to meeting a threshold condition associated with the given power limit.

In alternative examples, the counter 650 may be arranged to send an interrupt to the power management circuitry 640 if the number of throttling assertions is either too high or too low. The counter may be incorporated in the embedded controller 620 or in the power management circuitry 640.

Figure 7:
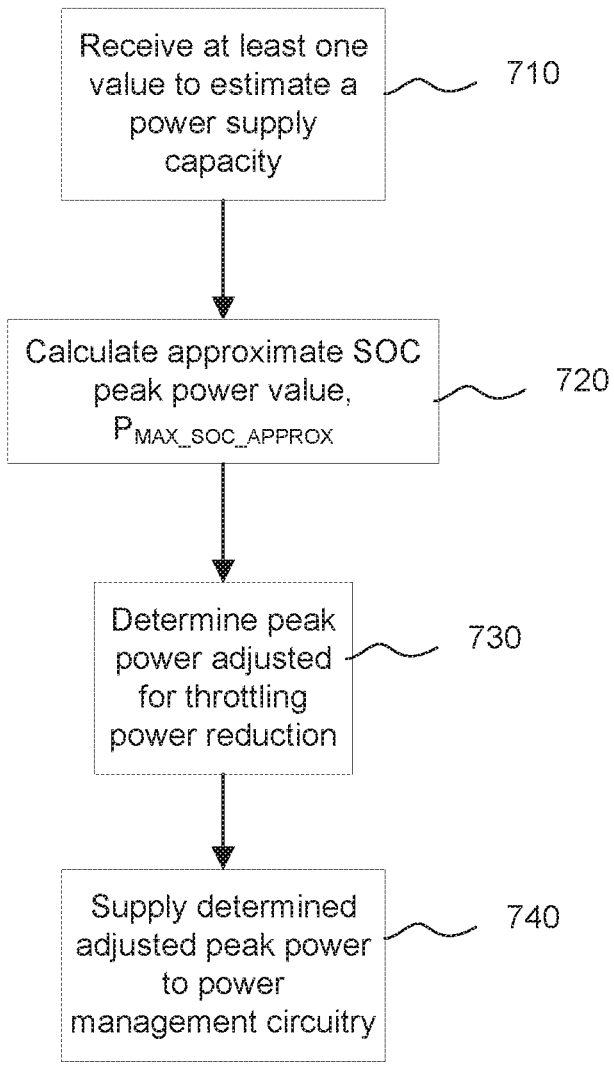
FIG. 7 is a flowchart providing an overview of a method of adjusting the peak power to an integrated circuit device.

FIG. 7 is a flowchart schematically illustrating a method 770 of adjusting the peak power value for an integrated circuit device.

In operation 710, at least one value is received by a power supply interface. The at least one value may be used to estimate a peak power capacity of a power supply serving the processing platform and may comprise one or more of a battery peak power, an adapter peak power and an ROP peak power.

In operation 720, an approximate peak power value for the integrated circuit device $P_{MAX\_SOC\_APPROX}$ is calculated by peak power determining circuitry. The approximate peak power may be calculated depending on how a power supply peak power is apportioned between the integrated circuit device and the ROP. The power supply may comprise a battery, an adapter or a combination of a battery and an adapter. Power from the adapter may be AC to DC converted mains power and this adapter power may be used to charge the battery as well as to power the integrated circuit device.

In operation 720, an adjusted (increased) peak power $P_{MAX\_SOC\_PK}$ is calculated for the integrated circuit by multiplying the peak power calculated in operation S720 by a power enhancement factor (also referred to as a multiplier) that is greater than one. In other example a calculation other than a simple multiplication may be applied. A peak power enhancement function used to calculate an enhanced peal power may include multiplication as one example, but could alternatively be any suitable function, simple or more complex. The value of the power enhancement factor or peak power enhancement function may be dependent on an amount by which the power supplied to the integrated circuit device is throttled (reduced) in response to assertion of the throttling signal such as the throttling signal 331 of FIG. 3.

In operation 740, the determined adjusted peak power is supplied to the power controller of the integrated circuit device.

Figure 8:
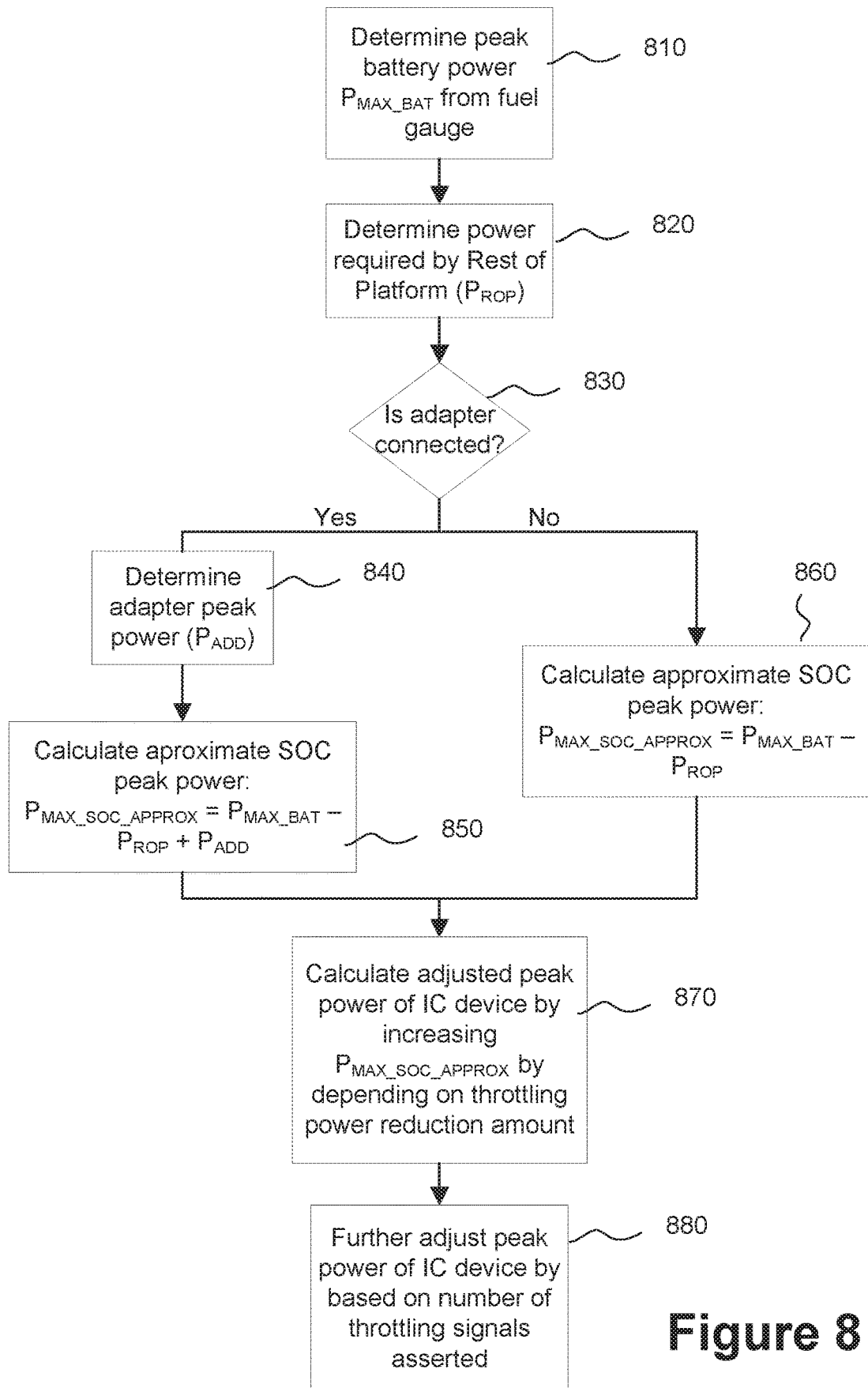
FIG. 8 is a flowchart illustrating a method of calculating a peak power of an IC device.

FIG. 8 is a flowchart schematically illustrating in more detail than FIG. 7, a method of calculating a peak power of an integrated circuit device. In operation 810, a fuel gauge of a battery reports a maximum power capability, $P_{MAX\_BAT}$. In some examples, the value of $P_{MAX\_BAT}$ may be based on a battery charge level and a calibrated full battery capacity. In operation 820, the power required by the rest of the platform, $P_{MAX\_ROP}$, is determined. The power required by the rest of the platform refers to power that has been allocated to other components within the system (such as the camera 262, display 264, audio 266 and USB 268 of the FIG. 2 example), and thus is not available for use by the integrated circuit device. Other components within the system may comprise input and output devices, peripherals, or any component of the system that draws power. In operation 830, it is determined whether or not an adapter is connected. If an adapter is connected it may provide at least a component of the total power supplied to the processing platform via the power supply interface.

If it is determined in operation 830 that an adapter is connected, the method progresses to operation 840, where an adapter peak power, $P_{MAX}\_ADP$, is determined. The adapter peak power, $P_{MAX\_ADP}$, is then used in operation 850 to calculate a sustained power, $P_{MAX\_SOC}$ for the integrated circuit device. $P_{MAX\_SOC}$ is calculated by finding a sum of the maximum battery power capability $P_{MAX\_BAT}$ and the adapter peak power $P_{ADP}$ and subtracting the power required by the rest of the platform, $P_{ROP}$. This is shown by Equation 5 below.

$$P_{MAX\_SOC\_APPROX}=P_{MAX\_BAT}+P_{MAX\_ADP}-P_{MAX\_ROP} \quad \text{equation 5}$$

If, however, it is determined in operation 830 that no adapter is connected, the method progresses to operation 860 where the sustained power, $P_{MAX\_SOC\_APPROX}$, may be calculated by subtracting the power required by the rest of the platform from the maximum battery power capability, $P_{MAX\_BAT}$. Similarly, in embodiments having only an adapter or only an alternative power supply but no battery then $P_{MAX\_SOC\_APPROX}$ may be calculated by subtracting the power required by the rest of the platform from the maximum adapter capability or maximum power source capability. In embodiments where the SOC or other integrated circuit device has a dedicated power supply then the power required by the rest of the platform may be zero, so this term may be omitted from equation 5 above.

Upon calculation of the sustained integrated circuit device power, $P_{MAX\_SOC\_APPROX}$, through either operation 850 or 860, the method progresses to operation 870, in which an approximate maximum peak power of the integrated circuit device, $P_{MAX\_SOC\_APROX}$, is calculated. The calculated $P_{MAX\_SOC\_APPROX}$ is multiplied by a multiplier to determine $P_{MAX\_SOC}$. The multiplier may be the power enhancement factor and may be based on the amount by which the power supplied to the integrated circuit device is throttled. A peak power enhancement function may be used to calculate $P_{MAX\_SOC}$, with one example being a multiplier. In operation 880, a peak power to be supplied to the integrated circuit device is corrected by adjusting $P_{MAX\_SOC}$ by an amount to increase it above a nominal power supply capability (e.g. peak battery power measured by fuel gauge) depending on a number of throttling signal assertions detected in a given time period.

Figure 9:
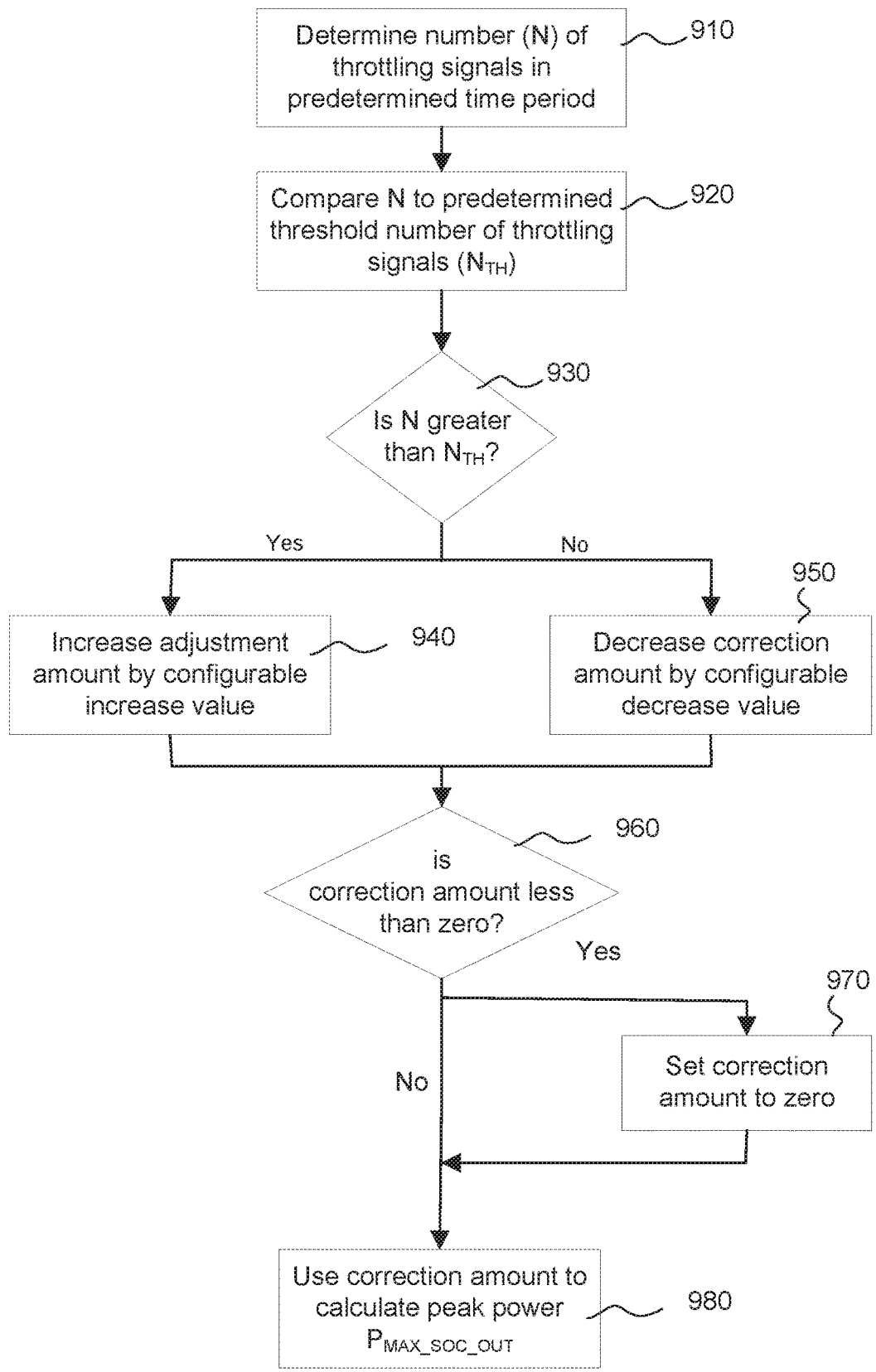
FIG. 9 is a flowchart illustrating a method of determining an adjustment amount for use in determination of a peak power of an integrated circuit device.

FIG. 9 is a flowchart schematically illustrating a method of determining the correction amount for use in a calculation of a peak power implemented in operation 880 of FIG. 8. Referring now to FIG. 9, a number of throttling signals, denoted N, is determined in operation 910. The data processing platform may determine a number of throttling signals within a predetermined time period, such as the preceding 10s as in the pseudocode example provided earlier in this description. In operation 920, the determined number of throttling signals, is compared to a predetermined threshold number of throttling signals, $N_{TH}$. The value of the predetermined threshold $N_{TH}$ may be set by a user, a manufacturer, or may be determined based on the behavior and configuration of the system in an automated process, but is not limited thereto. More than one threshold may be provided, for example an upper threshold number and a lower threshold number. The value of $N_{TH}$ may be adjusted according to performance of the system. In operation 930, it is determined whether or not the number of throttling signals exceeds the value of the predetermined threshold $N_{TH}$. If it is determined that the number of throttling signals, N, does exceed the threshold $N_{TH}$, the method proceeds to operation 940. In operation S940, a correction amount is increased—that is, the amount by which the power is to be adjusted is increased relative to a previously set correction amount. The value of the correction amount may be initialized to zero. The correction amount may be increased by a predetermined increase value, or its increase may be determined based on factors such as system performance, number of throttling signals, etc. The value $P_{MAX\_SOC\_PK}$ may be output to the SOC bypassing the correction stage 582 in some embodiments. The term "correction" may be interpreted as a further adjustment.

If, however, it is determined in operation 930 that the number of throttling signals N does not exceed the threshold $N_{TH}$, the method instead proceeds to operation 950. In operation 950, the correction amount $P_{CORRECTION}$ is decreased—that is, the amount by which the power is to be adjusted is decreased. The adjustment amount may be decreased by a predetermined decrease value, which may or may not be equal in magnitude to the predetermined increase value used in operation 940, or may be determined based on factors such as system performance, number of throttling signals, etc.

After the correction amount has been increased or decreased in operations 940 or 950 respectively, the method continues to operation 960 where the correction amount is compared to zero. If the correction amount is less than zero, then the method proceeds to operation 970 where it is overwritten to have a zero value. This ensures a non-negative correction amount. If the correction amount is not less than zero, or after the correction amount has been overwritten with a zero value in operation 970, the method continues to operation 980 where the determined correction amount $P_{CORRECTION}$ is used in the calculation of the peak power $P_{MAX\_SOC\_OUT}$ of the integrated circuit device. For example, as performed by the first subtracter 582 of the FIG. 5 example.

In this specification, the phrase "at least one of A or B" and the phrase "at least one of A and B" and should be interpreted to mean any one or more of the plurality of listed items A, B etc., taken jointly and severally in any and all permutations.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Circuitry may be implemented, for example, as a hardware circuit comprising processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), logic gates, registers, semiconductor devices, chips, microchips, chip sets, and the like.

The processors may comprise a general purpose processor, a network processor that processes data communicated over a computer network, or other types of processor including a reduced instruction set computer RISC or a complex instruction set computer CISC. The processor may have a single or multiple core design. Multiple core processors may integrate different processor core types on the same integrated circuit die Machine readable program instructions may be provided on a transitory medium such as a transmission medium or on a non-transitory medium such as a storage medium. Such machine readable instructions (computer program code) may be implemented in a high level procedural or object oriented programming language. However, the program(s) may be implemented in assembly or machine language, if desired. In any case, the language may be a compiled or interpreted language, and combined with hardware implementations.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In some embodiments, one or more of the components described herein may be embodied as a System On Chip (SOC) device. A SOC may include, for example, one or more Central Processing Unit (CPU) cores, one or more Graphics Processing Unit (GPU) cores, an Input/Output interface and a memory controller. In some embodiments a SOC and its components may be provided on one or more integrated circuit die, for example, packaged into a single semiconductor device.

EXAMPLES

The following examples pertain to further embodiments.
1. Peak power setting circuitry to set a peak power value for an integrated circuit device, the integrated circuit device having throttling circuitry to assert a power reducing feature of the integrated circuit device in response to a throttling signal assertion, the peak power setting circuitry comprising:
- a power supply interface to receive a value to estimate a peak power capacity of a power supply serving the integrated circuit device;
- processing circuitry to:
  - determine an approximate peak power for the integrated circuit device from the estimated peak power capacity of the power supply; and
  - determine a peak power for the integrated circuit device by increasing the approximate peak power for the integrated circuit device depending on an amount by which the integrated circuit device power is reduced in response to assertion of the throttling signal.

2. Peak power setting circuitry may be the subject-matter of example 1 or any other example herein, wherein the value to estimate the peak power capacity of the power supply comprises at least one of a peak battery power, a peak adapter power and a dedicated power source.

3. Peak power setting circuitry may be the subject-matter of example 1 or any other example herein, wherein the throttling signal assertion indicates that at least one of a threshold voltage, a threshold power and a threshold current has been crossed.

4. Peak power setting circuitry may be the subject matter of example 3 or any other example herein, wherein the processing circuitry is to determine at least one further peak power for the integrated circuit device, the at least one further peak power having a further approximate peak power different from the approximate peak power and wherein the further peak power has a respective further throttling signal to which the integrated circuit device has a corresponding power-reducing response.

5. Peak power setting circuitry may be the subject matter of example 4 or any other example herein, wherein the peak power corresponds to a first power limit up to which the integrated circuit is permitted to sustain power for up to a first duration of time whereas the further peak power corresponds to a second power limit up to which the integrated circuit is permitted to sustain power for a second duration of time, wherein the second duration of time is different from the first duration of time.

6. Peak power setting circuitry may be the subject-matter of any one of examples 1 to 5 or any other example herein, the processing circuitry comprising:
correction circuitry to correct the determined peak power for the integrated circuit depending on a number of assertions of the throttling signal in a given time period.

7. Peak power setting circuitry may be the subject-matter of example 6 or any other example herein, wherein the correction to the determined peak power comprises decreasing the determined peak power relative to the increased approximate peak power when the number of assertions of the throttling signal in the given time period is higher than a threshold maximum number of throttling assertions.

8. Peak power setting circuitry may be the subject-matter of example 6 or any other example herein, wherein the correction to the determined peak power comprises increasing the determined peak power relative to the increased approximate peak power when the number of assertions of the throttling signal in the given time period is lower than a threshold minimum number of throttling assertions.

9. Peak power setting circuitry may be the subject-matter of example 6 or example 7 or any other example herein, comprising a counter to maintain a count of the number of assertions of the throttling signal in the given time period.

10. Peak power setting circuitry may be the subject-matter of example 9 or any other example herein, comprising interrupt generating circuitry to send an interrupt to the processing circuitry responsive to at least one of: the number of throttling signal assertions exceeding the threshold maximum number in the given time period; or the number of throttling signal assertions being less than the threshold minimum number in the given time period.

11. Peak power setting circuitry may be the subject-matter of any one of examples κ to 10 or any other example herein, wherein the correction circuitry is to determine the correction iteratively in response to at least one of: updates to the number of assertions of the throttling signal and updates to the estimated peak power capacity of the power supply.

12. Peak power setting circuitry may be the subject-matter of example 11 or any other example herein, wherein the correction circuitry is to implement a Proportional Integral Differential algorithm to perform the iterative correction.

13. Peak power setting circuitry may be the subject-matter of any one of examples 1 to 12 or any other example herein, wherein the processing circuitry is responsive to an indication from a battery fuel gauge of a change in a peak power capability of a battery or of a battery state of charge, to update the peak power determination using an updated value for the estimated peak power supply capacity.

14. Peak power setting circuitry may be the subject-matter of any one of examples 1 to 13 or any other example herein, comprising threshold calculation circuitry to calculate the at least one of a threshold voltage, a threshold power and a threshold current depending on the determined peak power for the integrated circuit device.

15. Peak power setting circuitry may be the subject-matter of example 14 or any other example herein, wherein the threshold calculation circuitry is arranged to calculate the at least one of the threshold voltage, threshold power and threshold current using an estimate for an impedance of the battery supply based on a peak battery power.

16. Peak power setting circuitry may be the subject-matter of example 15 or any other example herein, wherein the threshold calculation circuitry is to calculate the peak battery power based on the determined peak power for the integrated circuit device.

17. Peak power setting circuitry may be the subject-matter of example 15 or example 14 or any other example herein, wherein the threshold calculation circuitry is to calculate the peak battery power based on at least one of: a peak power of an adapter of the power supply and the estimated power consumption of the ROP excluding the integrated circuit device.

18. Peak power setting circuitry may be the subject-matter of any one of examples 14 to 17 or any other example herein, wherein the threshold calculation circuitry is arranged to calculate the at least one of the threshold voltage, threshold power and threshold current using a duration of time between the throttling signal being asserted and the power reducing feature taking effect to reduce the power.

19. Peak power setting circuitry may be the subject-matter of any one of the preceding examples or any other example herein, wherein the power supply comprises a battery unit and wherein the power supply interface is to receive a value for a peak power capability of the battery unit and wherein the peak power capacity of the power supply is estimated using the peak power value of the battery unit.

20. Peak power setting circuitry may be the subject-matter of any one of examples 1 to 19 or any other example herein, wherein the power supply interface is to receive an adapter peak power value and wherein the data processing circuitry is to estimate the peak power capacity of the power supply by adding the adapter peak power value to the battery unit peak power value.

21. Peak power setting circuitry as claimed in any one of examples 1 to 20 or any other example herein, wherein the integrated circuit device forms part of a processing platform and wherein the determination of the approximate peak power for the integrated circuit comprises deducting from the estimated peak power capacity an estimated power consumption of one or more elements of the processing platform sharing the power supply with the integrated circuit device.

22. A processing platform comprising:
an integrated circuit device having at least one processor; and
the peak power setting circuitry of any one of examples 1 to 18 to set a peak power of the integrated circuit device.

23. An embedded controller comprising the peak power setting circuitry of any one of examples 1 to 20.

24. Machine-readable instructions provided on at least one machine-readable medium, the machine-readable instructions, when executed, to cause processing hardware to:
receive at least one value to estimate a peak power capacity of a power supply serving an integrated circuit device;
determine an approximate peak power for the integrated circuit device based on the estimated peak power capacity of the power supply; and
determine a peak power for the integrated circuit device by increasing the approximate peak power for the integrated circuit device according to a peak power enhancement function, wherein the peak power enhancement function depends on an amount by which the integrated circuit device power is reduced by the integrated circuit device in response to assertion of a throttling signal.

25. An operating system comprising the machine-readable instructions of example 23.

26. The machine-readable instructions of claim 24 provided on a non-transitory storage medium.

27. A method of setting a peak power value for an integrated circuit device, the integrated circuit device having power management circuitry to assert a power reducing feature of the integrated circuit device in response to a throttling signal assertion, the method comprising:
receiving at least one value to estimate a peak power capacity of a power supply serving the integrated circuit device;
determining an approximate peak power for the integrated circuit device based on the estimated peak power capacity of the power supply; and
determining a peak power for the integrated circuit device by increasing the approximate peak power for the integrated circuit device according to a peak power enhancement function, wherein the peak power enhancement function depends on an amount by which the integrated circuit device power is reduced by the integrated circuit device in response to assertion of a throttling signal.

28. The method of example 27, wherein the throttling signal assertion indicates that at least one of a threshold voltage, a threshold power and a threshold current has been crossed.

29. Means for setting a peak power value for an integrated circuit device, the integrated circuit device having means for throttling to assert a power reducing feature of the integrated circuit device in response to a throttling signal assertion, the means for setting peak power comprising:
means for receiving a value to estimate a peak power capacity of a power supply serving the integrated circuit device;
means for processing to:
determine an approximate peak power for the integrated circuit device from the estimated peak power capacity of the power supply; and
determine a peak power for the integrated circuit device by increasing the approximate peak power for the integrated circuit device depending on an amount by which the integrated circuit device power is reduced in response to assertion of the throttling signal.

30. The means for setting a peak power value of example 29, wherein the throttling signal assertion is received by the integrated circuit device and indicates that at least one of a threshold voltage, a threshold power and a threshold current has been crossed.

The invention claimed is:

1. A circuit comprising peak power setting circuitry to set a peak power value for an integrated circuit device, the integrated circuit device having throttling circuitry to assert a power reducing feature of the integrated circuit device in response to a first throttling signal assertion, the peak power setting circuitry including:
a power supply interface to receive a value to estimate a peak power capacity of a power supply serving the integrated circuit device; and
processing circuitry to:
determine a first approximate peak power for the integrated circuit device using the estimated peak power capacity of the power supply;
determine a first peak power for the integrated circuit device by increasing the first approximate peak power for the integrated circuit device depending on an amount by which the integrated circuit device power is reduced in response to assertion of the throttling signal; and
determine a second peak power for the integrated circuit device, the second peak power having a second approximate peak power different from the first approximate peak power, wherein the second peak power has a respective second throttling signal assertion to which the integrated circuit device has a corresponding power-reducing response, wherein the first peak power corresponds to a first power limit up to which the integrated circuit is permitted to sustain power for up to a first duration of time, and wherein the second peak power corresponds to a second power limit up to which the integrated circuit is permitted to sustain power for a second duration of time, wherein the second duration of time is different from the first duration of time.

2. The circuit of claim 1, wherein the value to estimate the peak power capacity of the power supply comprises at least one of a peak battery power, a peak adapter power, and a dedicated power supply.

3. The circuit of claim 1, wherein the first throttling signal assertion or the second throttling signal assertion indicates that at least one of: a threshold voltage, a threshold power, and a threshold current has been crossed.

4. The circuit of claim 1, wherein the processing circuitry is to determine at least one further peak power for the integrated circuit device, the at least one further peak power having a further approximate peak power different from the first approximate peak power and the second peak power, and wherein the further peak power has a respective further throttling signal to which the integrated circuit device has a corresponding power-reducing response.

5. The circuit of claim 1, wherein:
the at least one further peak power includes a further peak power that corresponds to a third power limit up to which the integrated circuit is permitted to sustain power for a third duration of time, wherein the third duration of time is different from the first duration of time.

6. The circuit of claim 1, the processing circuitry comprising:
correction circuitry to correct the determined first peak power for the integrated circuit depending on a number of assertions of the first throttling signal in a given time period.

7. The circuit of claim 6, wherein the correction to the determined first peak power comprises decreasing the determined first peak power relative to the increased first approximate peak power when the number of assertions of the first throttling signal in the given time period is higher than a threshold maximum number of throttling assertions.

8. The circuit of claim 6, wherein the correction to the determined first peak power comprises increasing the determined first peak power relative to the increased first approximate peak power when the number of assertions of the first throttling signal in the given time period is lower than a threshold minimum number of throttling assertions.

9. The circuit of claim 6, further comprising interrupt generating circuitry to send an interrupt to the processing circuitry responsive to at least one of: the number of first throttling signal assertions exceeding the threshold maximum number in the given time period; or the number of throttling signal assertions being less than the threshold minimum number in the given time period.

10. The circuit of claim 6, wherein the correction circuitry is to determine the correction iteratively in response to at least one of: updates to the number of assertions of the first throttling signal and updates to the estimated peak power capacity of the power supply.

11. The circuit of claim 10, wherein the correction circuitry is to implement a Proportional Integral Differential algorithm to perform the iterative correction.

12. The circuit of claim 1, wherein the processing circuitry is responsive to an indication from a battery fuel gauge of a change in a peak power capability of a battery or of a battery state of charge, to update the first peak power determination using an updated value for the estimated peak power supply capacity.

13. The circuit of claim 1, comprising threshold calculation circuitry to calculate the at least one of a threshold voltage, a threshold power, and a threshold current depending on the determined first peak power for the integrated circuit device.

14. The circuit of claim 13, wherein the threshold calculation circuitry is arranged to calculate the at least one of the threshold voltage, threshold power, and threshold current using an estimate for an impedance of the battery supply based on a peak battery power.

15. The circuit of claim 14, wherein the threshold calculation circuitry is to calculate the peak battery power based on the determined first peak power for the integrated circuit device.

16. The circuit of claim 14, wherein the threshold calculation circuitry is to calculate the peak battery power based on at least one of: a peak power of an adapter of the power supply and the estimated power consumption of a rest of platform (ROP) excluding the integrated circuit device.

17. The circuit of claim 13, wherein the threshold calculation circuitry is arranged to calculate the at least one of the threshold voltage, threshold power, and threshold current using a duration of time between the first throttling signal being asserted and the power reducing feature taking effect to reduce the power.

18. The circuit of claim 1, wherein the power supply comprises a battery unit and wherein the power supply interface is to receive a value for a peak power capability of the battery unit and wherein the peak power capacity of the power supply is estimated using the peak power value of the battery unit.

19. The circuit of claim 1, wherein the power supply interface is to receive an adapter peak power value and wherein the data processing circuitry is to estimate the peak power capacity of the power supply using the adapter peak power value.

20. The circuit of claim 1, further comprising the integrated circuit.

21. The circuit of claim 1, wherein peak power setting circuitry is included in an embedded controller.

22. At least one non-transitory machine-readable medium having instructions stored thereon that, when executed, cause processing hardware to:
receive at least one value to estimate a peak power capacity of a power supply serving an integrated circuit device;
determine a first approximate peak power for the integrated circuit device based on the estimated peak power capacity of the power supply;
determine a first peak power for the integrated circuit device by increasing the first approximate peak power for the integrated circuit device according to a peak power enhancement function, wherein the peak power enhancement function depends on an amount by which the integrated circuit device power is reduced by the integrated circuit device in response to assertion of a first throttling signal; and
determine a second peak power for the integrated circuit device, the second peak power having a second approximate peak power different from the first approximate peak power, wherein the second peak power has a respective second throttling signal to which the integrated circuit device has a corresponding power-reducing response, wherein the first peak power corresponds to a first power limit up to which the integrated circuit is permitted to sustain power for up to a first duration of time, and wherein the second peak power corresponds to a second power limit up to which the integrated circuit is permitted to sustain power for a second duration of time, wherein the second duration of time is different from the first duration of time.

23. The at least one non-transitory machine-readable medium of claim 22, wherein the instructions, when executed, are further to implement an operating system.

24. A method of setting a peak power value for an integrated circuit device, the integrated circuit device having power management circuitry to implement a power reducing feature of the integrated circuit device in response to a throttling signal assertion, the method comprising:

receiving at least one value to estimate a peak power capacity of a power supply serving the integrated circuit device;

determining a first approximate peak power for the integrated circuit device from the estimated peak power capacity of the power supply;

determining a first peak power for the integrated circuit device by increasing the first approximate peak power for the integrated circuit device according to a peak power enhancement function, wherein the peak power enhancement function depends on an amount by which the integrated circuit device power is reduced by the integrated circuit device in response to assertion of a first throttling signal; and determining a second peak power for the integrated circuit device, the second peak power having a second approximate peak power different from the first approximate peak power, wherein the second peak power has a respective second throttling signal to which the integrated circuit device has a corresponding power-reducing response, wherein the first peak power corresponds to a first power limit up to which the integrated circuit is permitted to sustain power for up to a first duration of time, and wherein the second peak power corresponds to a second power limit up to which the integrated circuit is permitted to sustain power for a second duration of time, wherein the second duration of time is different from the first duration of time.

25. The method of claim 24, wherein the first throttling signal assertion or the second throttling signal assertion is received by the integrated circuit device and indicates that at least one of: a threshold voltage, a threshold power, and a threshold current has been crossed.

* * * * *